No. 777,913. PATENTED DEC. 20, 1904.
L. OBERMEIER.
TAPE MEASURE.
APPLICATION FILED APR. 14, 1903.
NO MODEL.
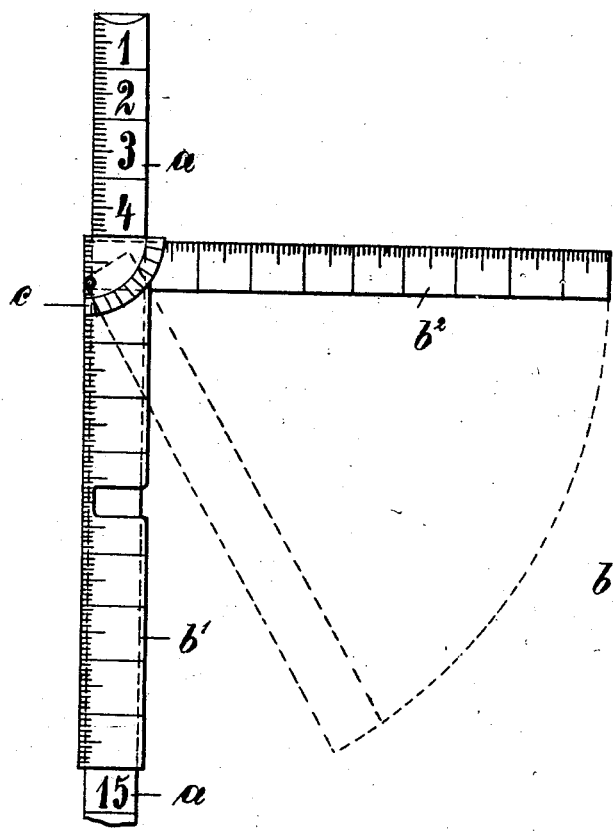

No. 777,913. Patented December 20, 1904.

UNITED STATES PATENT OFFICE.

LUDWIG OBERMEIER, OF MUNICH, GERMANY.

TAPE-MEASURE.

SPECIFICATION forming part of Letters Patent No. 777,913, dated December 20, 1904.

Application filed April 14, 1903. Serial No. 152,629.

*To all whom it may concern:*

Be it known that I, LUDWIG OBERMEIER, a subject of the King of Bavaria, residing at Munich, in the Kingdom of Bavaria, German Empire, have invented new and useful Improvements in Tape-Measures, of which the following is a specification.

My invention relates to improvements in tape-measures such as are employed by tailors in measuring persons for suits, uniforms, &c.

In taking a person's measure the tailor has to hold the end of the tape between the fingers and must press more or less firmly against the body of the person being measured. This, however, proves disagreeable to many customers, especially to corpulent persons, and more particularly when leg or arm measurements are being taken.

According to my invention, this inconvenience is overcome by providing a flexible tape-measure, the end of which slides in a stiff sheath of metal, celluloid, or other suitable material, having a limb jointed to it and capable of being turned so as to lie at a right angle to the body of the sheath.

In the accompanying drawings, Figure 1 is a front view of the end portion of a tape-measure to which the stiff sliding sheath is applied. Fig. 2 is an edge view of the subject of Fig. 1.

The flexible tape-measure $a$ fits into a stiff sheath $b'$. This sheath slides over the tape-measure $a$ and has a stiff limb $b^2$, pivoted to it for the purpose of presenting a hold for the hand. After use the limb $b^2$ can be closed down, so as to lie in line with the tape.

Such a tape-measure is exceedingly practical, especially in trying on and in fitting clothes. When desired, the sheath can be left out of use and the tape employed alone in the ordinary manner.

The sheath may, as shown in Fig. 1, be provided with an angular scale $c$ for the purpose of enabling angles to be measured, and the sheath and the stiff limb $b^2$ may also be graduated in any desired manner.

Having thus described my invention, what I claim as new, and desire to secure by Letters Patent, is—

1. A flexible tape-measure having a stiffened end, consisting of a stiff sheath in which the extremity of the tape slides and which has a limb jointed to it and closing down into it, substantially as and for the purposes set forth.

2. A flexible tape-measure having a stiffened end, consisting of a stiff sheath in which the extremity of the tape slides and which has a limb jointed to it and an angular scale on which the angle of inclination of the limb to the sheath may be read, all substantially as described.

In testimony whereof I have signed this specification in the presence of two subscribing witnesses.

LUDWIG OBERMEIER.

Witnesses:
GEORG KÖNNER,
EDMUND WILSON.